United States Patent [19]

Chawan et al.

[11] Patent Number: 5,532,016
[45] Date of Patent: Jul. 2, 1996

[54] COUSCOUS-LIKE PRODUCT MADE FROM PASTA SCRAP

[75] Inventors: Dhyaneshwar B. Chawan, Liverpool; Carleton G. Merritt, Phoenix; Stephen R. Gillmore, Port Byron, all of N.Y.

[73] Assignee: Borden, Inc., Columbus, Ohio

[21] Appl. No.: 484,271

[22] Filed: Jun. 7, 1995

[51] Int. Cl.$^6$ ........................................................ A23L 1/16
[52] U.S. Cl. .......................... 426/557; 426/518; 426/473; 426/451
[58] Field of Search ...................... 426/537, 451, 426/466, 473, 517, 518

[56] References Cited

U.S. PATENT DOCUMENTS

| | | | |
|---|---|---|---|
| 2,677,613 | 5/1954 | Shiah | 99/85 |
| 3,615,674 | 10/1971 | Bass | 99/80 |
| 3,947,597 | 3/1976 | Kieffaber | 426/27 |
| 4,243,690 | 1/1981 | Murakami et al. | 426/557 |
| 4,368,210 | 1/1983 | Murakami et al. | 426/557 |
| 4,446,163 | 5/1984 | Galle et al. | 426/448 |
| 5,334,407 | 8/1994 | Donnelly et al. | 426/618 |

OTHER PUBLICATIONS

Hummel, C. Macaroni Products, Manufacture, Processing and Packing, 2nd Ed., 1966 Food Trade Press, Ltd. London pp. 194–195.

*Primary Examiner*—Jeanette Hunter
*Attorney, Agent, or Firm*—Watson Cole Stevens Davis

[57] ABSTRACT

A method for making a couscous-like product from scrap generated during conventional pasta production.

7 Claims, No Drawings

COUSCOUS-LIKE PRODUCT MADE FROM PASTA SCRAP

FIELD OF THE INVENTION

This invention relates to a method of manufacturing couscous-like products from what is generally considered to be a consumable waste-product generated during traditional pasta production.

BACKGROUND OF THE INVENTION

Couscous is a wheat-based particulate product having a moisture content of about 11% to less than 13% and having a size of about 0.85 to about 2.5 millimeter mesh. The proper size range for dried particles is from about 0.85 to about 2.5 millimeter mesh. The particles of a specific couscous product should not vary by more than 1 mm mesh, preferably not more than 0.5 mm mesh between the largest and smallest particle. Uniformity of size is a mark of quality for couscous, and it is not easily achieved by known methods of manufacture.

The dried product is generally rehydrated for example by steaming or boiling, and the product gives a granular mouth feel.

The required property of granular mouth feel further requires that the particles remain separate and not stick together when they are rehydrated for consumption. Cooking with sauces or moisture should soften the particles, but the particles should have a resistance to bite. Chewing of particles should shear them and the chewed particles should not be brittle or rubbery, or sticky or pasty or gummy. The traditional granular mouth feel associated with the cooked product is critical.

The traditional method for making couscous has been by mixing water with durum wheat, i.e., semolina in a gissa or a large wooden dish. The mixture is then rubbed between the palms of one's hands to form agglomerates or small irregularly shaped granules. These granules are screened to the proper size, followed by steam precooking. Proper size couscous particles are then selected for sun-drying. Sun-dried couscous has a very long shelf life.

It was not until 1979 that a commercial method was developed for making couscous. The major problems associated with this known commercial technique has centered on the quality and particularly the expense of obtaining that quality.

U.S. Pat. No. 5,334,407 discloses a method for making a new couscous food product via an extrusion method. As described in the patent, a major step in conducting the method is that of extruding a cooked mixture of wheat-based composition and water maintained under an elevated temperature between about 70° C. and 100° C. and a pressure from about 13 bar up to about 41 bar and a moisture content of at least 25% but not over 44% by weight through an extrusion die having openings of substantially uniform size within the size limits from about 0.5 square millimeters up to about 7 square millimeters. The wheat-based composition is comprised essentially of the starches and gluten-forming proteins in a blend of, by dry solids weight, at least about 65% up to 100% of durum wheat flour or middlings of semolina and about 35% down to 0% of flours or middlings or frinas of cereal grains other than durum wheat. Within the extruder, the dough is cooked, hydrated and dehydrated prior to extrusions, it is then extruded and then cut.

A blade flush with the die face of the extruder contacts the extrudate cutting from the extrudate stub-like particles. The particles are then dried to a moisture content of about 13% by weight.

A stated advantage of this process is that all particles can be directly formed to satisfy a size criteria or within 0.85 mesh to 2.5 mm mesh, with all particles of a particular batch substantially uniform in shape and equal in size and ready for packaging.

The production of traditional pasta products such as spaghetti, lasagna, linguine and vermicelli, also requires the preparation of a semolina flour and water mixture and extrusion of the pasta product. Extrusion is performed in such a manner that the extruded alimentary paste remains substantially uncooked. Extruded lengths are cut and then subjected to a drying step, as known as in the art, to lower the moisture content of the extruded product from between about 20% and about 30% by weight down to between about 10% and about 15% by weight and preferably between 11% and 14%, based on the weight of the dried pasta. Traditionally, the pasta is dried at temperatures between 90°–212° F. for about 5 to about 18 hours. The resulting pasta must then be packaged and to accomplish this is subjected to further cuttings, creating tails and heads and other waste products that have heretofore been discarded or ground and returned to a hopper to be mixed with a water and semolina mixture. The present invention relates to a method of using this regrind product to create a acceptable couscous-like product.

SUMMARY OF THE INVENTION

The present invention is directed to a method for manufacturing a couscous-like product from conventional pasta including the step of drying pasta without cooking it and then grinding the dried pasta.

DESCRIPTION OF THE INVENTION

Heads and tails of pasta lengths as described above and having a moisture content of approximately between 10% and 15% by weight of dried pasta are ground for instance by passage through a set of superposed and parallel arranged grinding rollers as is known in the art. The rollers have a corrugated surface to assist in grinding, and the distance between the two rollers can be adjustable. Such a machine is sold by Sangati A single pass through the rollers produces granules which can then be sifted to produce specific couscous products. Two varieties of couscous can be made based on the sifting process. A coarse product is defined as a product wherein 94% of the granules pass through a 10 mesh sieve (2.00 mm) with no more than 6% left on the mesh or not more than 6% passing through an 18 mesh (1.00 mm) screen.

A medium product is defined as a product wherein 92% of the granules pass through a 20 mesh sieve (0.85 mm) with no more than 8% of the granules remaining on the screen or not more than 8% passing through a 40 mesh (0.425 mm).

The couscous-like product can also be produced using a swinging knife machine sold by Procter Industries or a swinging hammer mill available from a host of manufacturers including Sprout Waldron, Blue Street Prater and Arbech. The method of grinding or producing the pasta particles for sifting is not critical. Granular products, as discussed above, are then subjected to grading by sieve or mesh screens to obtain substantially uniform commercial products.

As discussed above, the product is produced from pasta heads, tails or from broken pieces of pasta from essentially long extruded pastas. These pastas are prepared by mixing a water-durum/wheat mixture in a mixer and extruding the mixture through a die.

A typical alimentary paste used to prepare pastas suitable for the present invention comprises, based on the weight of uncooked pasta, between about 67.0% and 80.0% by weight (solids basis) of semolina flour (having an inherent moisture content of between about 10% and 15% and preferably between about 11% and about 14% by weight, and a protein content of between about 11% and about 14% by weight), the balance being optional additives and added water.

More specifically, a suitable paste may be prepared from 10 kg fancy durum patent flour and about 2200 grams of added water; a lower moisture formulation may be prepared by adding about 1500 grams of added water to the same amount of flour.

The paste may contain additives including release agents such as glycerol monostearate, a sulfhydryl reducing agent and added vitamins, e.g. B-vitamins and eggs.

Water can be introduced in the form of ice before or during extrusion, to prevent swelling of the paste during extrusion. The water, or moisture, content is preferably between about 25.0% and about 30.0% by weight of the paste. In this application, water or moisture content refers to total moisture, that is, inherent moisture, or moisture naturally present in the flour and other ingredients, as well as added water. The term "water" as used herein includes water in all physical states, i.e., steam, ice or liquid water, or mixtures thereof.

The flour, water and any additives used may be mixed in any way conventional in the art, such as by mixing in a vertical cutter mixer (e.g. a Hobart Cutter/Planetary Mixer) for approximately one minute, at which time the pasta dough is ready for extrusion in any of the conventional pasta shapes. Alternatively, the components of the paste may be separately introduced into an extruder without prior mixing. After extrusion the created pasta shapes are then preferably subjected to a drying step.

Shaped pasta is prepared from the paste by extrusion. Extrusion can be performed with any acceptable extruder. The alimentary paste is fed into the extruder wherein it may, optionally, be blended, in the case of a screw-type extruder, or further blended, if the feedstock was premixed before being fed into the extruder, and then forced by internal pressure through the channels or lands of a die face having a plurality of orifices forcing the paste to conform to a desired shape. The orifices of the die face are defined by the openings of through lands or channels in the die head. The cross sections of the lands may decrease, e.g. in stepwise fashion, in the direction of extrusion or may have a uniform cross-section. The shapes of the orifices on the die face determine the profile of the extruded pasta shape. Such shapes include, for instance, spaghetti, fettucine, linguine, lasagna, or the like.

The alimentary paste passes through the die due to internal pressure generated by a rotating screw or screws. Suitable screw speeds range from about 3.5 to 35 revolutions per minute (rpm), and preferably about 20 rpm to 23 rpm. A particularly optimal screw speed is about 25 rpm. In general, screw speeds in excess of about 30 rpm appear to result in a compromised texture and increased starch loss in the pasta product, whereas screw speeds of less than about 3.5 rpm render the extrusion process economically unfeasible.

The screw speed is chosen to result in an extrusion rate, for example, in the range of about 50 grams per minute (g/min) (6.6 lb/hr) to about 500 g/min (66 lb/hr) or greater, preferably about 175 g/min (23 lb/hr), based on a six-orifice die having approximately two inch deep or long lands.

Optimized extrusion rate appears to be correlated to, inter alia, die temperature, barrel temperature, port temperature and screw speed. For example, at a screw speed of 3.5 rpm and at barrel and port temperatures of 110° F. and 120° F. (43° C. and 48° C.), respectively, acceptable extrusion rates on a six-orifice die of 62 and 55 g/min result. Whereas, at 110° F. and 10.5 rpm, an acceptable extrusion rate of 175 g/min occurs.

Vacuum pressure may or may not be used. If used, a vacuum of about 40 cm Hg to about 60 cm Hg preferably about 40 cm Hg may be used.

Commercial extrusion dies in the alimentary paste art are elongated structures and quite massive, and expensive to produce. Such dies are fabricated from brass. Dies for practicing the invention have a multiplicity of very small die openings or holes. All openings for any one die are preferably of equal size (i.e., equal in area dimension). The openings may vary from about 0.5 to about 5 or 6 square millimeters. Square or multi-sided openings may be used, but ideally the openings are circular to give a cylindrical shape. Vermicelli and spaghetti dies are preferred, though others may be used.

Once extruded the pasta is then dried at a medium temperature range. Pasta is currently dried at low temperatures of about 90°–110° F., medium temperatures of about 111°–162° F. and at high temperatures of 163°–212° F. Drying conditions need not be rigidly controlled since the conditions used will depend not only on the temperature but the drying time. Drying may be effected by heated air, infrared irradiation or microwave radiation. Pasta produced from lower temperature drying needs additional drying time to perform as a couscous-like product. It is noted that if a low-temperature-dried pasta product is used, hard lumps would form during cooking. During pasta drying, the protein (gluten), of complex of two principal endosperm proteins gliadin and glutenin, which exists as a film around starch granules is denatured and set depending on the moisture content and temperature of drying. These proteins perform an important binder function; they form a water-insoluble network of protein mass about the starch materials of the dried product. The product can therefore be stored for long periods of time.

Because of the uniform and small granulation of these particles, the couscous-like product cooks instantly in hot water without forming hard lumps. As the product cooks the starch becomes gelatinized and the protein cover which originally is tough becomes more extensible. No pre-cooking of the granules is required.

To make an organoleptically acceptable product, three parts of water by weight are brought to a boil and then removed from heat. One part of the granulated pasta product is added to the heated water and mixed well. In two to three minutes, which is a period of time less than required to prepare traditional couscous, this pasta dish is ready to serve.

The addition of vegetables such as peppers, onions, carrots, etc. into the water would provide a variety of taste to this product. Additionally, for taste, a small amount of salt and butter may be added.

It is emphasized that this product is made by regrinding a dried pasta product. The dried product could be conventional spaghetti, lasagna, vermicelli, linguine, etc. or could be the heads or tails or pasta waste products produced in the manufacture of such pasta. The granular product functions like couscous and requires no specialized equipment as is required in traditional couscous processing or as required as disclosed in the '407 patent. The product of the invention allows the pasta formulator to eliminate waste or the need to use or send regrind back into an original paste mixture which would lower the overall consumer quality of a finished pasta product.

The following examples provide a further illustration of the invention.

EXAMPLE 1

An alimentary paste was made by mixing 6 pans semolina flour with one part water using a Hobart cutter/mixer to form a dough having a total moisture content of 26%. An extruder was used, being fitted with a die plate for producing an elongated paste product having a diameter of conventional spaghetti. Lengths were cut and the spaghetti was dried in a standard industries pasta drier at 70° C. for six hours. The product was determined to have a moisture content of between 11–13%. The dried product was then subjected to grinding. The ground product was collected and sieved to produce a medium product wherein 90% of the granules pass through a 20 mesh sieve.

EXAMPLE 2

Cooking

Three parts of water were brought to a boil and heat was removed. One pan of the uniformly ground pasta of Example 1 was added to the water. The product cooked in about 1.5 minutes.

In view of the above it is seen that a couscous-like produce can be successfully prepared from dried pasta products. The method of the invention produces uniform shelf-storage products without differing from the simple methods now used to manufacture pasta. The method of the invention eliminates waste associated with traditional pasta-making as pasta lengths cut and disposed (or which are normally recycled to the hopper to reduce costs but which produces a lower quality pasta product) can be sold and marketed as a couscous-like product. The process of the present invention, unlike the process of the '407 patent requires no cooking of the wheat/water mixture.

The cook time of the product of the invention is less than that of traditional couscous and is thus more energy efficient.

Those skilled in the art will recognize that this invention may be embodied in other species than illustrated without departing from the spirit and scope of the essentials of this invention. The foregoing discussion is therefore to be considered illustrative and not restrictive. The scope of the invention only being limited by the appended claims.

What is claimed is:

1. A method for making a couscous-like product comprising: mixing durum wheat and water to produce a conventional alimentary paste, forming said paste into an elongated non-cooked alimentary paste; drying said elongated alimentary paste to a moisture content of about 11–13% to produce a dry storage-stable product, grinding said product and sifting said product to produce uniform couscous-size granules.

2. The method of claim 1 wherein said drying is conducted at 162° F. or higher.

3. The method of claim 1 wherein said grinding is achieved by cutter blades, rollers or a hammer mill.

4. The method of claim 1 wherein a second drying step is conducted prior to sifting said product.

5. The method of claim 1 wherein said dried pasta product comprises the heads and tails or other scraps of pasta from commercial pasta production.

6. The method according to claim 1 wherein a coarse couscous dimensioned product is obtained by sifting couscous-dimensioned granules so that 94% of the granules pass through a 10 mesh sieve with no more than 6% left on the mesh or not more than 6% passing through an 18 mesh screen.

7. The method according to claim 1 wherein a medium couscous dimensioned product is produced by sifting couscous dimensioned granules so that 92% of the granules pass through a 20 mesh sieve with no more than 8% of the granules remaining on the mesh or not more than 8% passing through a 40 mesh screen.

* * * * *